Nov. 25, 1941.     W. P. BRADLEY     2,263,690
TIRE MOUNTING DEVICE FOR ROLLERS
Filed May 18, 1938
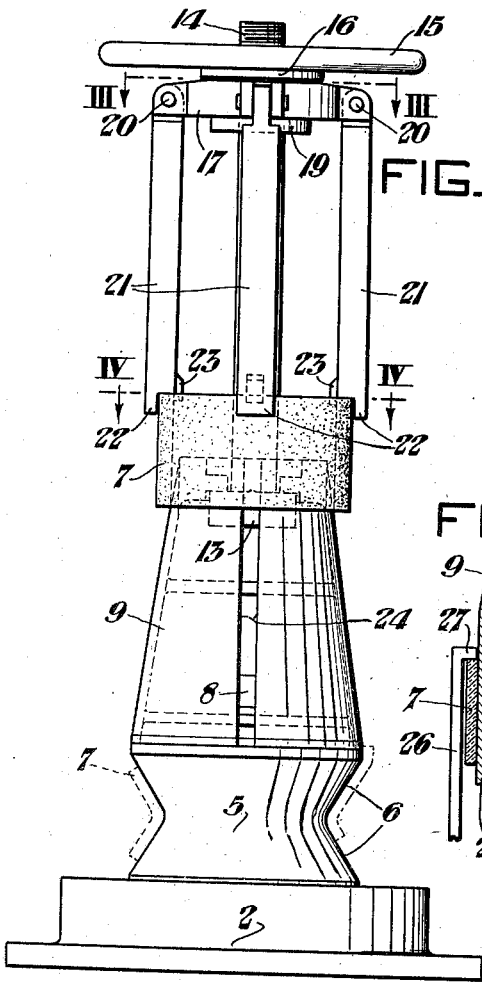
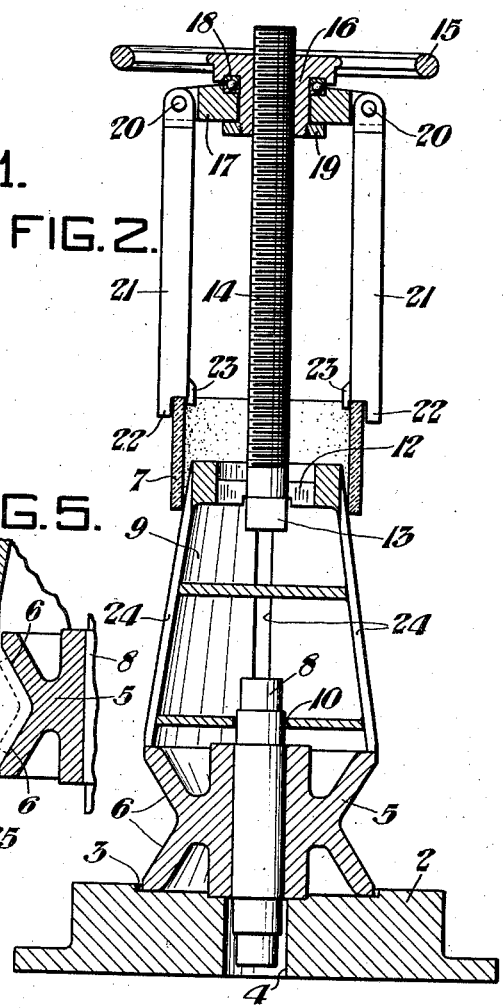
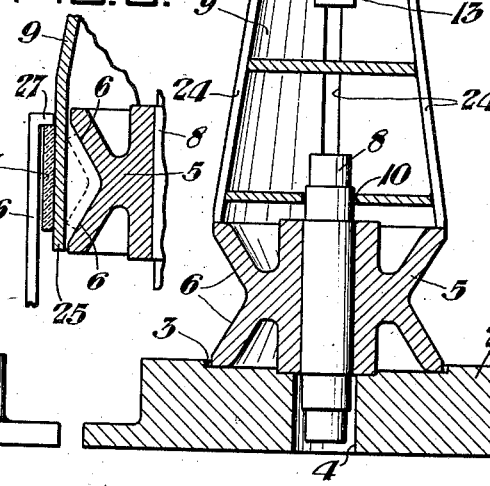
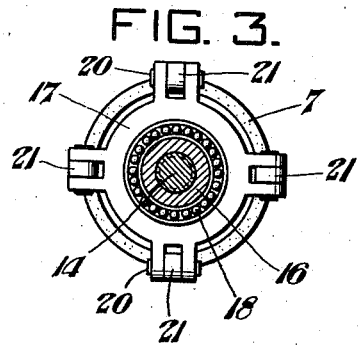
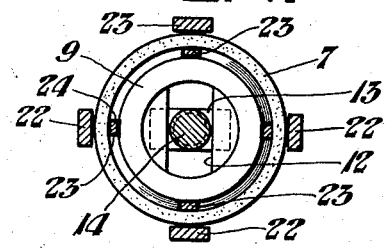
Inventor:
WILLIAM P. BRADLEY,
by: John E. Jackson
his Attorney.

Patented Nov. 25, 1941

2,263,690

UNITED STATES PATENT OFFICE 2,263,690

TIRE MOUNTING DEVICE FOR ROLLERS

William P. Bradley, Crafton, Pa., assignor to National Tube Company, a corporation of New Jersey Application May 18, 1938, Serial No. 208,694

5 Claims. (Cl. 29—88.2)

This invention relates to a method and device for mounting cushioning means, such as rubber tires or bands and the like, on rollers.

In the manufacture of pipe and other tubular stock, it is usually transferred from one operation to the next by means of power driven metallic rollers, which usually have V-shaped peripheries. When pipes having a threaded or other machined portion on each end thereof are transferred by such means, it is desirable to provide rollers having a cushion-like periphery so that the threads or machined portion will not be damaged by direct metal contact with the rollers. It is the usual practice to provide metallic rollers having a rubber band or tire mounted around the periphery thereof.

Heretofore, it has been difficult to assemble these bands or tires on the rollers and, at the same time, prevent them from working loose and coming off, and it is to this that the present invention relates.

It is an object of this invention to provide an improved method and device for quickly and easily assembling rubber tires or bands, or other suitable cushioning means, on the periphery of rollers.

It is another object of the invention to provide an improved method and device for assembling rubber cushioning tires or bands and the like on the periphery of rollers so that they will stay thereon without the need of providing additional means for holding them thereon.

Various other objects and advantages of this invention will more fully appear during the course of the following specification and will be particularly pointed out in the appended claims.

In the accompanying drawing, I have shown, for the purpose of illustration, one embodiment which my invention may assume in practice.

In the drawing:

Figure 1 is a side elevation of the improved tire mounting device of my invention;

Figure 2 is a vertical section thereof;

Figure 3 is a section taken on line III—III of Figure 1;

Figure 4 is a section taken on line IV—IV of Figure 1; and,

Figure 5 is a section through a portion of a modified construction of my improved tire mounting device.

The improved tire mounting device of my invention, as shown in the drawing, comprises a base section 2 having a circular recess 3 in the top surface thereof which is concentrically arranged with a hole 4 therethrough. There is arranged on this base section a conveyor roller wheel 5 having a spindle 8 and an outer V-shaped periphery 6 on which a stretchable annular cushioning member, such as a rubber cushioning tire or band 7 is adapted to be mounted.

There is mounted on top of the roller 5 a metallic frustum section 9 of a cone, preferably made of chromium plated steel, having a base portion whose diameter is at least as large as the outer diameter of the wheel 5 and a hole 10 therein through which the spindle 8 is adapted to extend to concentrically position the frustum on the roller.

The top portion of the frustum has a slotted hole 12 therein which is adapted to receive the T-headed end portion 13 of a screw 14. The threaded portion of the screw 14 carries a hand-wheel 15 having a nut-portion 16 integral therewith which is adapted to cooperate with the threads of the screw. There is loosely mounted on the nut-portion 16 of the hand-wheel a yoke member section 17 and a thrust bearing 18 positioned between the yoke and the nut-portion, and, preferably, a nut 19, for holding the yoke thereon. There is arranged around the periphery of the yoke 17, and pivotally attached thereto at 20, a plurality of downwardly extending arms 21 having lip or hook portions 22 on the outer end thereof and oppositely disposed similar lip or finger-like portions 23 on the inside thereof which are adapted to cooperate with guide grooves 24 carried by the outer surface of the frustum 9 to guide the arms in their movement.

The tire mounting device of my invention operates as follows:

To assemble the device for use, a roller 5 on which the rubber tire or band 7 is to be mounted is first positioned on the base-plate 2 with its spindle extending into the hole 4 thereof. The frustum 9 of the cone is then mounted on top of the roller with the opposite end of the spindle 8 of the roller extending through the hole 10 of the frustum which is adapted to hold it in position thereon. The stretchable annular cushioning member to be mounted thereon, such as a rubber tire or band 7, is then placed over and around the small upper end of the frustum 9. The T-portion 13 of the screw 14 is then inserted through the slotted hole 12 in the top part of the frustum and turned at right angles thereto to lock it therein, and the arms 21 properly positioned in contact with the upper edge of the rubber tire. The device is then in an operative position. The hand-wheel 15 is then turned to carry the yoke 17 and the arms 21 downwardly which, in turn, forces the rubber tire over the frustum from the small end to the large end thereof, thereby stretching it as it passes thereover and finally positioning it on the periphery of the roller in a stretched condition. It will be seen that the arms 21 will not travel quite far enough to properly position the rubber tire on the roller and it can be easily forced to the desired position by a few slight blows with a hammer.

In Figure 5, there is shown a modified form of the improved tire mounting device of my invention. The frustum of the cone 9 of this modified construction has a straight cylindrical lower portion 25 which has an internal diameter of larger dimensions than the outer diameter of the roller 5 and is adapted to fit over and telescope the roller as shown. There is also provided a stripper 26 having an upper flanged portion 27. This stripper may be in the form of a plurality of arms pivotally attached to the base 2. In operation, the tire or band is stretched over the frustum, as described, and moved onto the straight cylindrical portion 25. After the tire is properly positioned thereon, opposite the periphery of the roller, the stripper or arms 26 are arranged so that the flanged portions 27 thereof contact the upper edge of the tire. The frustum of the cone is then moved upwardly away from the roller and base, thereby stripping the tire or band from the cylindrical portion thereof and allowing it to snap, due to its resiliency, into place on the periphery of the roller.

As a result of my invention, it will be seen that the rubber cushioning tire or band is securely retained on the roller of its own accord; that is, due to its resiliency, and it is not necessary to provide cement or other additional means for holding the tire in place thereon.

I have shown the applying of a rubber tire to a roller having a V-shaped periphery, but it will be understood that with the use of my device rubber tires or bands can be mounted on rollers having peripheries of various shapes, such as concave or flat surfaces.

While I have shown and described an embodiment of my invention, it will be understood that this embodiment is merely for the purpose of illustration and description and that various other forms may be devised within the scope of my invention, as defined in the appended claims.

I claim:

1. Apparatus for assembling stretchable annular cushioning members on the periphery of rollers and the like comprising means for supporting and holding the roller to which the annular cushioning member is to be applied, a frustum of a cone having a base diameter at least as great as the largest outer diameter of the roller, means for positioning said frustum base concentrically on one side of said roller, the smaller end of said frustum which is adapted to initially receive the annular cushioning member to be applied having an outer diameter less than the inner diameter of the unstretched annular member, a screw having the lower end thereof removably attached to the smaller end of said frustum and extending vertically thereabove, a nut arranged on the threaded portion of said screw, a plurality of downwardly extending rigid arms pivotally attached to said nut, the lower ends of said arms adapted to be positioned against the upper edge of said annular cushioning member to force the same over said frustum upon the turning and downward movement of said nut so as to gradually stretch and finally position the cushioning member upon the periphery of said roller guiding means arranged on the outer surface of said frustum, and means carried by each of said rigid arms which is adapted to cooperate with the guiding means carried by said frustum for guiding the arms in their vertical movement along said frustum so as to prevent the arms from turning and twisting.

2. A device for assembling stretchable annular cushioning members on the periphery of rollers and the like comprising a frustum of a cone having a base diameter at least as large as the outer diameter of the roller to which the annular member is to be applied, a screw arranged axially of said frustum and extending beyond the smaller end thereof, means for removably attaching one end of said screw to the smaller end of said frustum, a nut carried by the threaded portion of said screw, and a plurality of rigid arms pivotally attached to said nut, said arms adapted to force the annular member to be applied over said frustum upon the turning and movement of said nut so as to gradually stretch and finally position the same on the periphery of said roller guiding means arranged on the outer surface of said frustum, and means carried by each of said rigid arms which is adapted to cooperate with the guiding means carried by said frustum for guiding the arms in their vertical movement along said frustum so as to prevent the arms from turning and twisting.

3. A device for assembling stretchable annular cushioning members on the periphery of rollers and the like comprising a base member for supporting and holding the roller to which the annular member is to be applied, a frustum of a cone having a base diameter at least as large as the diameter of said roller, a screw arranged axially of said frustum and extending beyond the small end thereof, means for removably attaching one end of said screw to the smaller end of said frustum, a nut-like hand wheel arranged on the threaded portion of said screw, an annular yoke member loosely and rotatably carried by said hand wheel, and a plurality of rigid arms pivotally attached to said yoke member, said arms being constructed and arranged so as to force the annular member over said frustum upon the turning of said hand wheel and movement thereof whereby the annular member is stretched and finally positioned upon the periphery of said roller guiding means arranged on the outer surface of said frustum, and means carried by each of said rigid arms which is adapted to cooperate with the guiding means carried by said frustum for guiding the arms in their vertical movement along said frustum so as to prevent the arms from turning and twisting.

4. Apparatus of the class described including, in combination, a frustum of a cone having a base diameter at least as great as the largest outer diameter of the roller to which an annular cushioning member is to be applied with the outer diameter of the top end thereof being slightly less than the inner diameter of the unstretched cushioning member, a base member for supporting and securely holding the roller to which the cushioning member is to be applied, means for positioning said frustum on said roller concentric therewith, a screw vertically arranged above said frustum and extending upwardly therefrom, means for removably attaching the lower end of said screw to the top end of said frustum, a nut arranged on the threaded portion of said screw, means arranged integral with said nut for turning the same, an annular yoke-like member rotatably disposed on said nut, a plurality of downwardly extending arms having their upper ends pivotally attached to said yoke-like member, said frustum having vertically extending guide grooves arranged in the outer surface thereof being equal in number to the number of arms, and an inwardly extending finger-like portion arranged on the inner side adjacent the lower end of each of said arms which are adapted to cooperate with their respective guide grooves in said frustum to guide the arms in their vertical movement and to prevent the same from turning and twisting, said arms adapted to force the cushioning member over said frustum upon the turning of said nut and the downward movement thereof whereby the cushioning member is stretched and finally positioned upon the periphery of said roller.

5. Apparatus of the class described including, in combination, a frustum of a cone having a base diameter at least as great as the largest outer diameter of the roller to which an annular cushioning member is to be applied with the outer diameter of the top end thereof being slightly less than the inner diameter of the unstretched cushioning member, a base member for supporting and securely holding the roller to which the cushioning member is to be applied, means for positioning said frustum on said roller concentric therewith, a screw vertically arranged above said frustum and extending upwardly therefrom, said screw having a T-shaped portion on the lower end thereof which is adapted to cooperate with a slotted hole in the top of said frustum whereby the screw is removably attached thereto, a nut arranged on the threaded portion of said screw, means arranged integral with said nut for turning the same, an annular yoke-like member rotatably disposed on said nut, a plurality of downwardly extending arms having their upper ends pivotally attached to said yoke-like member, said frustum having vertically extending guide grooves arranged in the outer surface thereof being equal in number to the number of arms, and an inwardly extending finger-like portion arranged on the inner side adjacent the lower end of each of said arms which are adapted to cooperate with their respective guide grooves in said frustum to guide the arms in their vertical movement and to prevent the same from turning and twisting, said arms adapted to force the cushioning member over said frustum upon the turning of said nut and the downward movement thereof whereby the cushioning member is stretched and finally positioned upon the periphery of said roller.

WILLIAM P. BRADLEY.